Dec. 19, 1967   S. A. WARREN ET AL   3,358,391
NEAR-POINT TACHISTOSCOPE
Filed Aug. 19, 1965   3 Sheets-Sheet 1
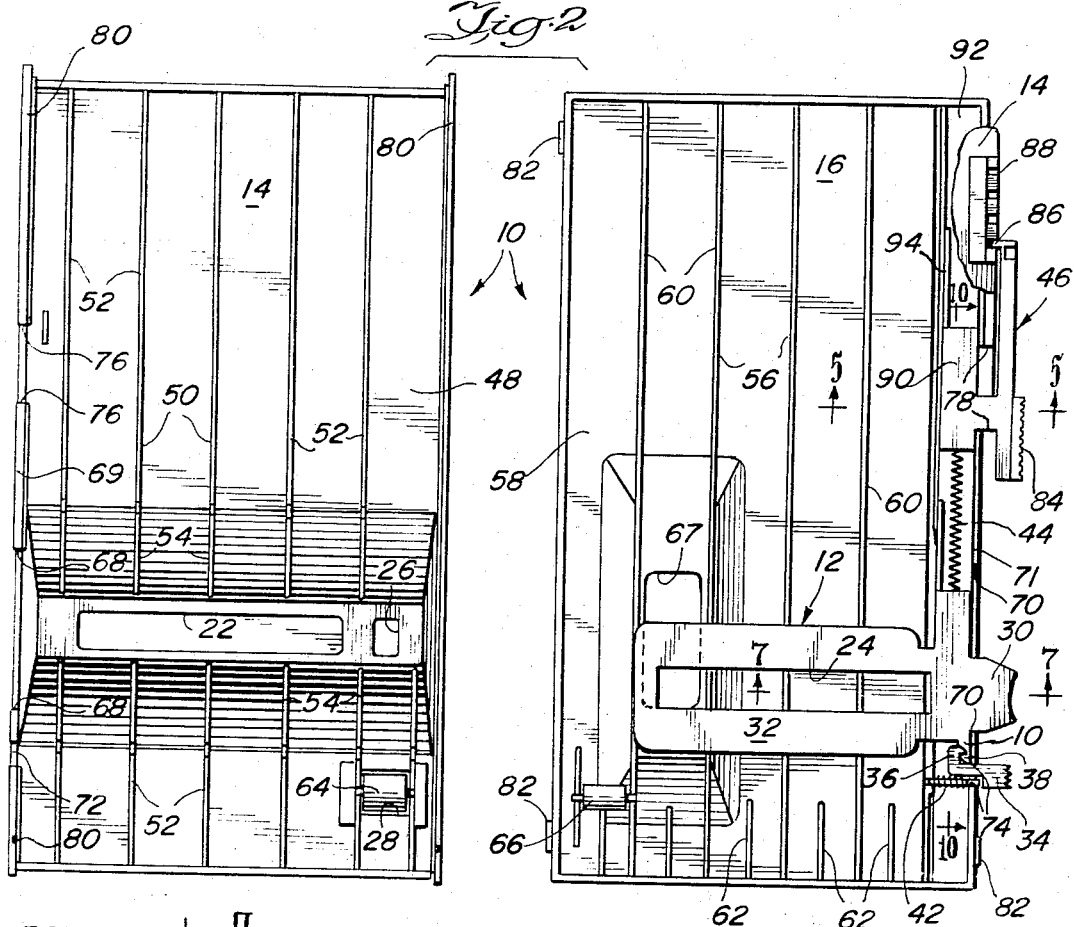
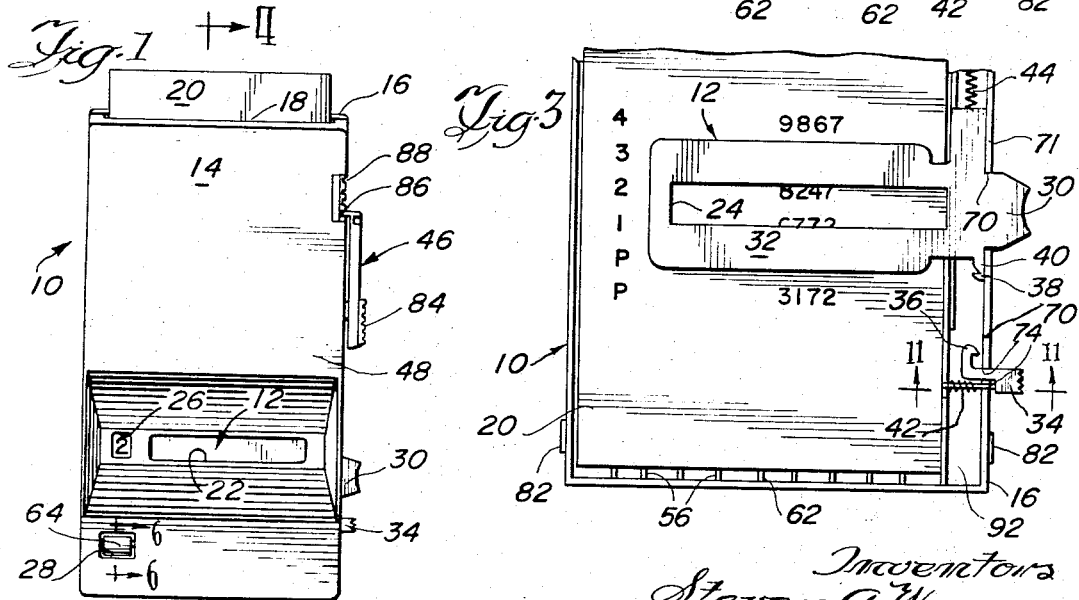
Inventors
Steven A. Warren
Gerald Zanck
By Dressler, Goldsmith, Clement, Gordon & Todd
Attorneys

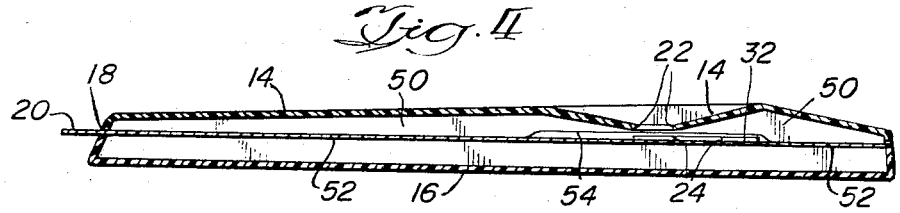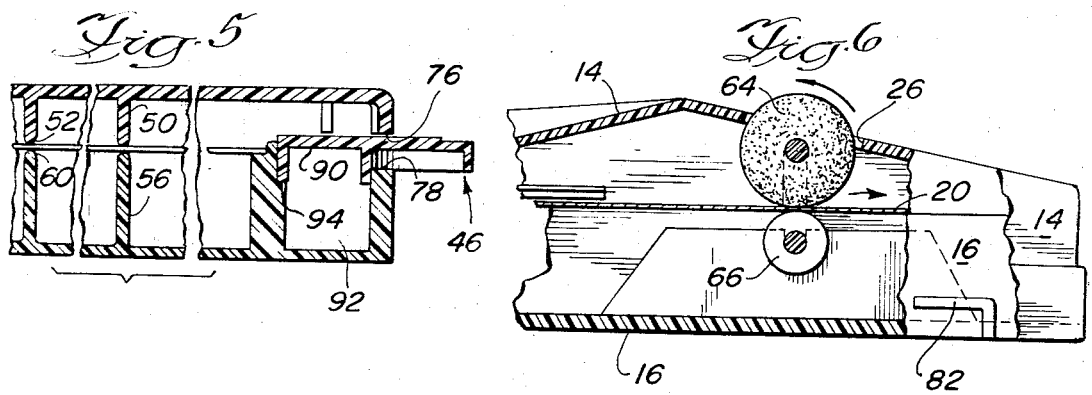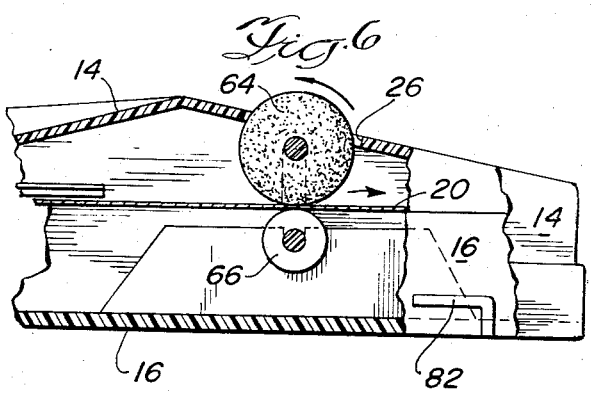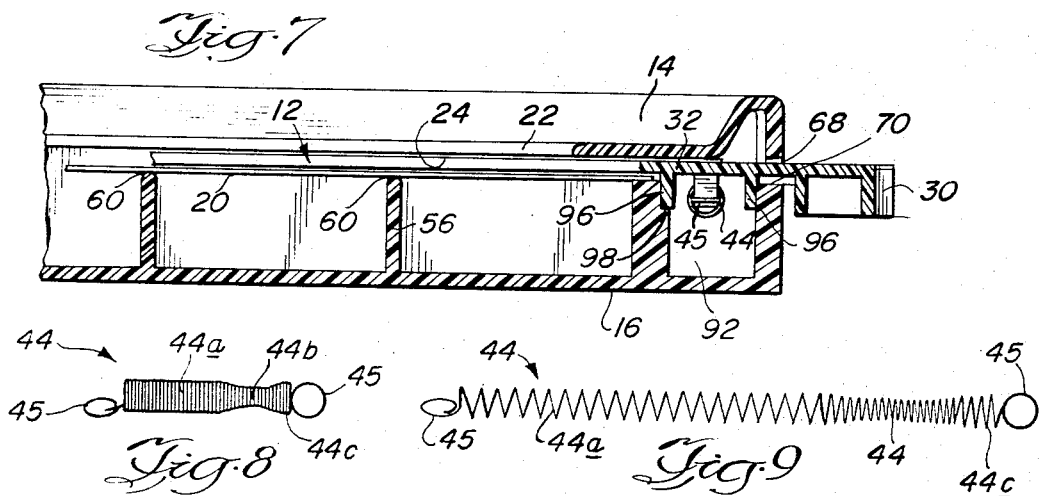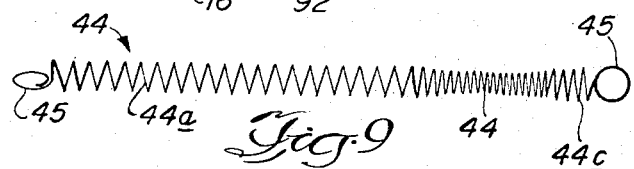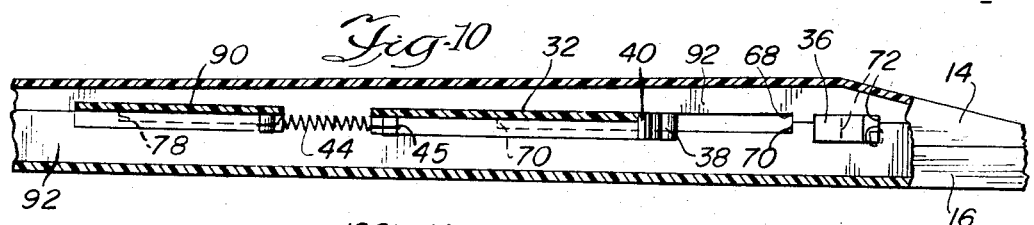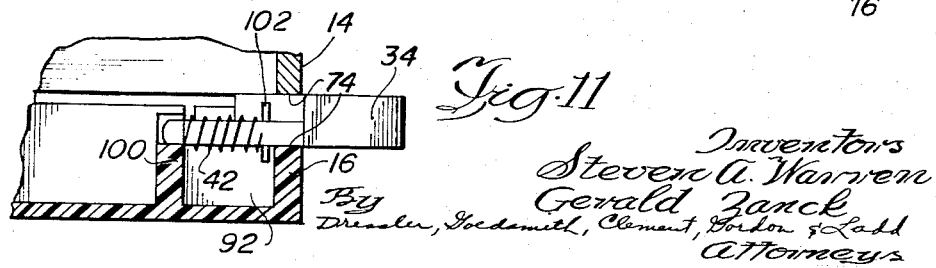

Dec. 19, 1967  S. A. WARREN ET AL  3,358,391
NEAR-POINT TACHISTOSCOPE

Filed Aug. 19, 1965  3 Sheets-Sheet 3

Inventors
Steven A. Warren
Gerald Zanck
By Dressler, Goldsmith, Clement & Gordon
Attorneys United States Patent Office 3,358,391
Patented Dec. 19, 1967

3,358,391
NEAR-POINT TACHISTOSCOPE
Steven A. Warren, 480 Sanders Road, Lake Forest, Ill. 60045, and Gerald Zanck, Chicago, Ill.; said Zanck assignor to said Warren
Filed Aug. 19, 1965, Ser. No. 480,946
9 Claims. (Cl. 35—35)

ABSTRACT OF THE DISCLOSURE

A near-point tachistoscope of relatively simplified form, for use with a sheet of symbols to be recognized when momentarily exposed. The illustrative embodiment has a shutter, finger tab and bolt mechanism all formed from a unitary piece. The sheet of symbols is advanced by a mechanism including two rollers positioned to press the sheet between them.

This invention relates to a near-point tachistoscope for use with a sheet of symbols to be recognized when momentarily exposed, and more particularly to such a device adapted to be conveniently held in the hand when it is in use.

Devices of this general type have been used for some time in the field of reading improvement, since it has been found that "flashing" or momentarily exposing words, numerals and other symbols for recognition by the person seeking to improve his reading skill will help improve his rate of reading through speeding up his rate of recognition of such symbols.

Existing devices are, however, relatively complicated in structure. Moreover, they often have exposed parts that may catch accidentally on the user's hands or clothing, and in any event detract from the aesthetic appearance of the device.

The near-point tachistoscope of the present invention is simple and economical in construction, is reliable in operation, and has a minimum of exposed parts.

The invention will be better understood by reference to the accompanying figures of the drawing in which:

FIGURE 1 is a top plan view of the near-point tachistoscope of this invention, with a sheet of numerals in place within the device;

The left hand portion of FIGURE 2 shows an enlarged bottom plan view of the top half of the near-point tachistoscope of FIGURE 1, and the right hand portion shows an enlarged top plan view of the bottom half of the same device (the tachistoscope being shown in cocked condition), with a fragmentary portion of the top container member being included for clarity in the upper right hand corner of the figure;

FIGURE 3 is a fragmentary showing of the bottom half of the device of the right hand portion of FIGURE 2, with a sheet of numerals in place for use, and the exposure control member in its discharge position;

FIGURE 4 is an enlarged cross-sectional view of the near-point tachistoscope of FIGURE 1, taken along line 4—4 of that figure;

FIGURE 5 is an enlarged fragmentary cross-sectional view taken along line 5—5 of FIGURE 2, showing a portion of the time control mechanism for this device;

FIGURE 6 is an enlarged fragmentary cross-sectional view taken along line 6—6 of FIGURE 1, showing the sheet advancing mechanism of this device;

FIGURE 7 is an enlarged fragmentary cross-sectional view taken along line 7—7 of FIGURE 2, showing the exposure control member, its finger tab and a portion of the tension means associated with the exposure control member;

FIGURE 8 is a side elevation of the tension means shown in FIGURE 7, in a fully retracted position;

FIGURE 9 is a side elevation of said tension means in an extended position;

FIGURE 10 is an enlarged fragmentary cross-sectional view taken along line 10—10 of FIGURE 2, showing the exposure control member and its associated tension means;

FIGURE 11 is an enlarged fragmentary cross-sectional view taken along line 11—11 of FIGURE 3, showing the trigger means for the exposure control member;

Figures 12, 14:
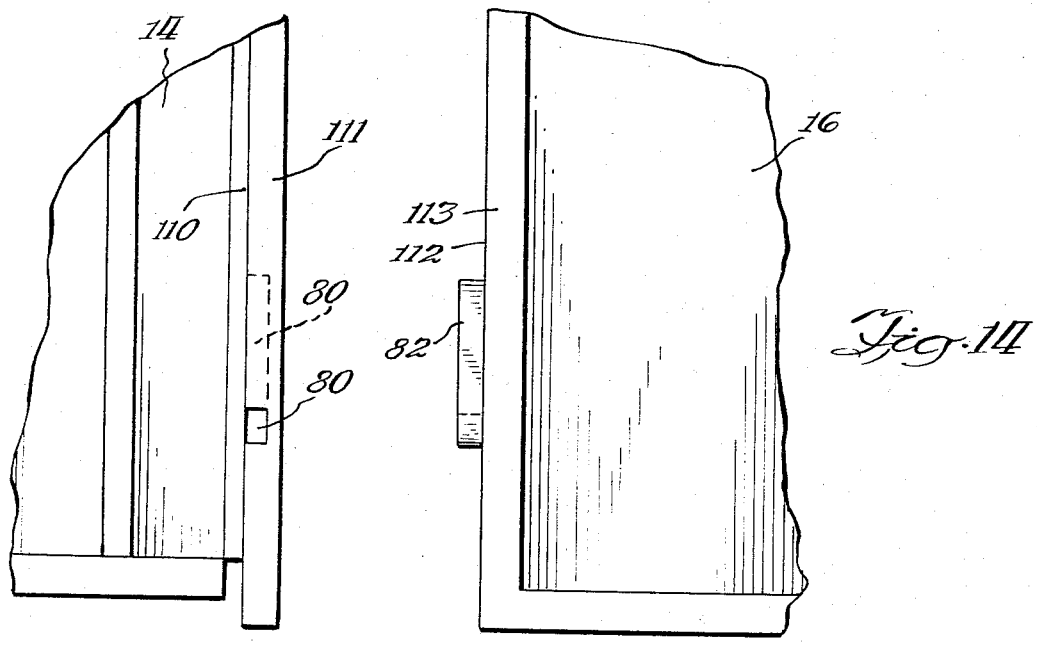
FIGURE 12 is an enlarged fragmentary view of the lower right portion of the container member illustrated in the left-hand portion of FIG. 2.
FIGURE 14 is an enlarged fragmentary view of the lower left portion of the container member illustrated in the right-hand portion of FIG. 2.

In FIGURE 1, near-point tachistoscope 10 includes exposure control member 12 which is positioned within a chamber formed by top container member 14 and bottom container member 16. Mating members 14 and 16 define slot 18 at one end of tachistoscope 10. A sheet of symbols 20 may be inserted through this slot 18, and pushed into operating position within the tachistoscope.

Near its end opposite slot 18, top container member 14 is provided with aperture 22, through which the user of the tachistoscope may view symbols on sheet 20 when a portion of the sheet is exposed through slot 24 (best seen in FIGURES 2 and 3) in exposure control member 12. Container member 14 is also provided with indexing aperture 26 adjacent viewing aperture 22, to permit the user to move sheet 20 into successive positions in which the symbols on the sheet which are to be viewed by the user will be brought into view one after the other, as desired by the user.

Top mating container member 14 is provided with another aperture 28 through which a portion of the sheet advancing mechanism by which sheet 20 is moved through the tachistoscope is exposed for manipulation by the user of the device. Operation of the sheet advancing mechanism will be described below.

As is best seen in FIGURES 2 and 3, exposure control member 12 consists of movable shield 32 having exposure slot 24 defined therein. It will also be seen from those figures that exposure control member 12 carries finger tab 30, which extends outside the chamber formed by mating container members 14 and 16 to an exposed position that permits the user of the device to move the exposure control member into the cocked position shown in FIGURE 2.

FIGURE 1 shows how trigger means 34 extends outside the chamber formed by mating container members 14 and 16. FIGURES 2 and 3, respectively, show how hook 36 at one end of trigger 34 can engage and release, as desired, complementary hook 38 at the end of bolt means 40 carried by exposure control member 12.

Trigger 34 is normally urged by coil spring 42 into a position where hook 36 of the trigger holds hook 38, bolt means 40, and exposure control member 12 in cocked condition. The slanted ends of hooks 36 and 38 permit hook 38 to ride over hook 36 whenever the user of the tachistoscope presses finger tab 30 downward to the point where hooks 36 and 38 engage each other. In other words, trigger means 34 and its biasing spring 42 cooperate with bolt means 40 on exposure control member 12 to permit the exposure control member to be selectively cocked and released by the user of the tachistoscope of this invention.

Tension means 44 is connected at one end to exposure control member 12, and at the other to time control mechanism 46. Time control mechanism 46, as will be explained in more detail below, is employed to govern the time of exposure that is produced when exposure control member 12 is triggered from its cocked condition into its discharge position to cause momentary exposure of symbols on sheet 20 when exposure slot 24 passes through a position of alignment with viewing aperture 22 in top container member 14. As is seen from FIGURES 1 and 2, time control mechanism 46 is included within the single chamber formed of the two mating container members 14 and 16, except for an exposed portion that protrudes out of the container for adjustment by the user of the tachistoscope.

FIGURES 1 and 2 show how top mating container member 14 is formed of thin outer wall 48 which helps define the outer contours of the container formed of members 14 and 16. Mating container members 14 and 16 are suitably made of a thin flexible material, as for example a plastic such as high impact polystyrene or a metal such as an aluminum alloy. The bottom of upper container member 14, seen in plan at the left hand side of FIGURE 2, is of concave shape. Member 14 has disposed within it parallel rib members 50 attached to thin outer wall 48.

Exposed edges 52 of rib members 50 lie in a single plane for a substantial portion of their length. However, in the area adjacent exposure control member 12, exposed edges 54 of rib members 50 are recessed for a distance longer than the distance spanned by exposure control member 12 during its travel from its cocked condition to its discharge position. The construction of rib members 50, with their exposed edge portions 52 lying in a single plane and their edge portions 54 being recessed adjacent exposure control member 12, is best seen in FIGURE 4.

The right hand portion of FIGURE 2 shows how parallel rib members 56 are attached to thin outer wall 58 of bottom container member 16. Thin outer wall 58 of container member 16 forms a concave shape as seen in FIGURE 2, and rib members 56 are contained within that shape. Exposed edges 60 of parallel rib members 56 all lie in a single plane throughout their length. Triangular webs 62, located between rib members 60, add additional strength to container member 16.

If top container member 14 in the left hand half of FIGURE 2 is thought of as being flipped over to the right upon bottom container member 16 on the right hand side of FIGURE 2, with left hand edge 69 of member 14 lined up with right hand edge 71 of member 16, it is seen that the assembled device of FIGURE 1 will be formed, with the two mating container members 14 and 16 defining a single chamber for sheet of symbols 20 and exposure control member 12. With members 14 and 16 thus assembled, the tachistoscope for this invention will appear from the top as seen in FIGURE 1, and in longitudinal cross-section as seen in FIGURE 4.

Corresponding parts of mating container members 14 and 16 will be aligned when these two members are assembled in the manner described. Parallel rib members 50 will lie above parallel rib members 56, with the plane of rib edges 52 being spaced from the plane of rib edges 60 by a distance slightly greater than the thickness of sheet of symbols 20, to provide a space for the movement of said sheet. The recessing of rib edges 54 described above, extending as it does for a distance longer than the distance spanned by exposure control member 12 during its travel from its cocked condition to its discharge position, provides space for movement of member 12 from one extreme of its travel to the other. As seen in FIGURE 3, exposure control member 12 helps to confine sheet of symbols 20 against edges 60 of parallel rib members 56 of bottom mating member 16.

When mating members 14 and 16 are assembled, rubber roller 64 is brought into contact with roller 66, which is formed of a somewhat harder material, such as a relatively hard plastic. As explained above, roller 64 extends through aperture 28 in top member 14, so that when the user rotates roller 64 (up in FIGURE 1, or to the left in FIGURE 6), sheet of symbols 20 will be advanced through the tachistoscope (downward in FIGURE 1, or to the right in FIGURE 6). Rollers 64 and 66 are arranged to provide a sufficient pressure between them that sheet 20 will be reliably advanced whenever roller 64 is rotated by the user. The pressure between the two rollers also provides a braking effect that will hold sheet 20 in the position selected by the user of the tachistoscope until roller 64 is actuated again.

Aperture 67 in bottom mating member 16 provides an auxiliary means of advancing sheet 20 through the tachistoscope of this invention, for the user may supplement the advancing action of rollers 64 and 66 by pressing with his fingers against sheet 20 to assist in the advance of the sheet.

Recess 68, 68 in side wall 69 of top container member 14 mates with recess 70, 70 in side wall 71 of bottom container member 16 to provide an aperture through which finger tab 30 of exposure control member 12 extends for actuation by the user of the tachistoscope. The upper and lower ends of the recesses 68, 68 and 70, 70 provide, in addition, stops which limit the travel of exposure control member 12 during use of this device.

Recess 72 in side wall 69 of top container member 14 mates with recess 74, 74 of side wall 71 of bottom container member 16. Recess 76, 76 in side wall 69 mates with recess 78 in side wall 71, to form an aperture through which time control mechanism 46 protrudes out of the chamber formed by mating container members 14 and 16.

Figures 13, 15:
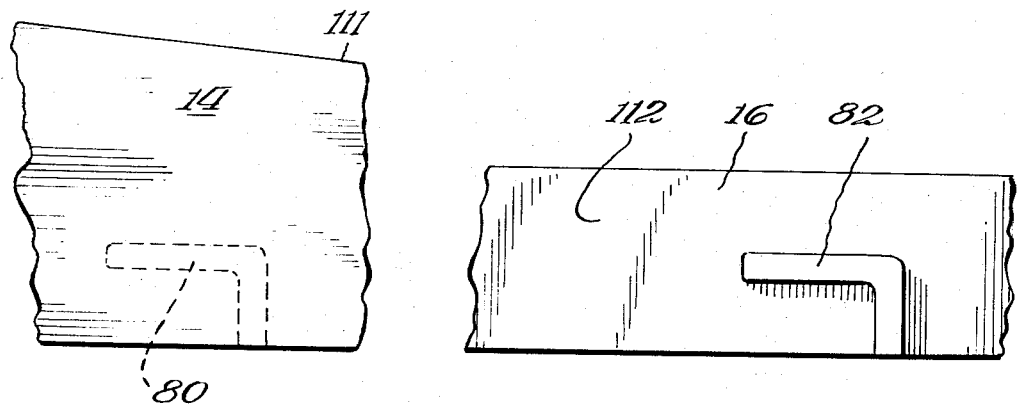
FIGURE 13 is an enlarged, side elevation thereof, with the container member turned over into the position it occupies when snapped in place over the bottom mating container member.
FIGURE 15 is an enlarged side elevation thereof.

Grooves 80 on the inner faces 110 of the side walls 111 of top member 14 are L-shaped to provide a complementary fit with ridges 82 on the outer faces 112 of the side walls 113 of bottom container member 16. The configuration of ridges 82, with two arms extending in different directions, is best seen in FIGURES 6 and 15, and the corresponding configuration of grooves 80, is best seen in FIGURE 13.

As best seen in FIGURES 1 and 2, time control mechanism 46 has a finger portion 84 by means of which it may be moved into various positions that will apply different degrees of tension to coil spring 44. Coil spring 44, shown in fully retracted position in FIGURE 8 and in an extended position in FIGURE 9, is preferably a tri-linear spring that comprises three sections 44a, 44b and 44c of different dimensions and configurations. In the embodiment shown, end sections 44a and 44c are cylindrical in shape but of different lengths. Intermediate section 44b is "necked down" in its middle portion, and acts to join end sections 44a and 44c. Each end of coil spring 44 is provided with an attaching loop 45.

When coil spring 44 is pulled out as shown in FIGURE 9, each portion 44a, 44b and 44c is extended in a different manner. The result is that application of an extending force to spring 44 causes the required tensional force to be placed on exposure control member 12 that will produce the exposure times, as for example $\frac{1}{25}$, $\frac{1}{50}$ and $\frac{1}{100}$ second, desired for best results in the flash recognition training program in which the device of this invention is intended to be used.

Time control mechanism 46 is provided with protuberance 86 that may be lodged in any of indentations 88 in the outer side wall of top container member 14. Adjustment of time control mechanism 46 is effected by moving its main body 90 through channel 92 on the right hand side of bottom mating member 16. Member 90 slides along flange 94 and recess 78, as is best seen in FIGURES 2 and 5.

As seen in FIGURES 3 and 7, exposure control member 12 slides above sheet 20, with its right hand portion 96 riding through channel 92, along flange 98 and recess 70. The cooperative action between exposure control member 12 and tension means 44 is perhaps best seen from FIGURES 2 and 3. Exposure control member 12 is shown in cocked condition in FIGURE 2, and in discharge position in FIGURE 3.

As has been explained above, coil spring 42 normally urges trigger 34 into a position in which it can engage its hook 36 with hook 38 of bolt means 40 of exposure control member 12. As is seen in FIGURE 11, coil spring 42 presses at one end against wall 100, which helps define channel 92, and at the other against pin 102 in the shaft of trigger 34.

In operation, the user of the tachistoscope of this invention cocks the device by pulling down finger tab 30 until hooks 36 and 38 are engaged. At this juncture, exposure control member 12 will be in the condition shown in FIGURES 1, 2 and 4. The user then rotates roller 64 as shown in FIGURE 6, to move sheet of symbols 20 as desired. The first two numbers on the sheet may be, as indicated in FIGURE 3, practice numbers, and the other numbers may be numbered serially, as for a test.

After the desired designator number is brought into view in aperture 26 and properly centered there, the user presses trigger 34 to permit spring 44 to pull exposure control member 12 into its discharge position. The speed with which exposure slot 24 flashes into and out of alignment with viewing aperture 22 (and the desired symbols on sheet 20) will of course be determined by the position of time control mechanism 46, and the resulting degree of tension exerted by that mechanism on spring 44. The manner in which exposure slot 24 lines up with viewing aperture 22 to provide momentary exposure of certain symbols on sheet 20 can probably be seen best from FIGURE 4.

When finger tab 30 strikes the end of recess 70 in right hand wall of bottom member 16, exposure control member 12 will be in the position shown in FIGURE 3. The user of the device may then press downward on finger tab 30 to return exposure control member 12 to its cocked condition. As he does so, he may take advantage of the "feedback" characteristic of this device, i.e., he may view the symbols on sheet 20, when exposure slot 24 passes viewing aperture 22 more slowly than it did when urged by spring 44, in order to check the accuracy of his recognition, of those symbols when the movement of exposure contrast member 12 under actuation of spring 44 permitted him a momentary glimpse of the symbols. The user may then advance sheet 20 to the next desired designator seen through indexing aperture 26.

It is seen that the near-point tachistoscope of this invention is simply and economically constructed, is convenient to operate, and presents the minimum number of protruding parts for use in operation of the device.

The above detailed description of this invention has been given for clarity of understanding only. No unnecessary limitations should be understood therefrom, as modifications will be obvious to those skilled in the art.

What is claimed is:

1. A near-point tachistoscope for use with a sheet of symbols to be recognized when momentarily exposed, which comprises: (a) an exposure control member formed of a unitary piece comprising a movable shield with an exposure slot therein; (b) bolt means integrally formed with said exposure control member; (c) a finger tab integrally formed with said exposure control member; (d) two mating container members, said two members defining a single chamber for said sheet of symbols and said exposure control member, one of said container members having an aperture through which the user of the tachistoscope may view symbols on said sheet when a portion of the sheet is exposed through the slot in said exposure control member; said finger tab extending outside said chamber to an exposed position to permit the user of the tachistoscope to move said exposure control member and its bolt means into cocked position; (e) trigger means to cooperate with said bolt means to permit the exposure control member to be selectively cocked and released by the user of the tachistoscope; and (f) tension means for urging said exposure control member, upon being triggered, from said cocked condition to a discharge position, so that said exposure slot passes momentarily over a symbol on said sheet and exposes it to the user of the tachistoscope.

2. The near-point tachistoscope of claim 1 which includes a time control mechanism to govern the time of the exposure that is produced when said exposure control member is triggered from its cocked condition, said exposure time control mechanism being included within said single chamber formed of said two mating container members, except for an exposed portion of said mechanism that protrudes out of the container for adjustment by the user of the tachistoscope.

3. The near-point tachistoscope of claim 1 in which said exposure control member confines said sheet of symbols against one of said mating container pieces.

4. The near-point tachistoscope of claim 1 in which each of said two mating container members includes a thin outer wall that helps define the outer contours of said container and each of said two mating container members has disposed within it a set of parallel rib members attached to said thin outer wall, said two sets of rib members defining between them a space for movement of both said sheet of symbols and said exposure control member.

5. A near-point tachistoscope for use with a sheet of symbols to be recognized when momentarily exposed, which comprises: (a) an exposure control member comprising a movable shield with an exposure slot therein; (b) bolt means carried by said exposure control member; (c) two mating container members, said two members defining a single chamber for said sheet of symbols and said exposure control member, one of said container members having an aperture through which the user of the tachistoscope may view symbols on said sheet when a portion of the sheet is exposed through the slot in said exposure control member; (d) a finger tab carried by said exposure control member, said tab extending outside said chamber to an exposed position to permit the user of the tachistoscope to move said exposure control member and its associated bolt means into cocked position; (e) trigger means to cooperate with said bolt means to permit the exposure control member to be selectively cocked and released by the user of the tachistoscope; and (f) tension means for urging said exposure control member, upon being triggered, from said cocked condition to a discharge position, so that said exposure slot passes momentarily over a symbol on said sheet and exposes it to the user of the tachistoscope; (g) a sheet advancing mechanism included with the single chamber defined by said two mating container members, said sheet advancing mechanism comprising two rollers positioned to press said sheet between them, one of said rollers being formed of softer material than the other, and one of said rollers being exposed, through an aperture in one of said two mating container pieces, for manipulation by the user of the tachistoscope.

6. A near-point tachistoscope for use with a sheet of symbols to be recognized when momentarily exposed, which comprises: (a) an exposure control member comprising a movable shield with an exposure slot therein; (b) bolt means carried by said exposure control member; (c) two mating container members, said two members defining a single chamber for said sheet of symbols and said exposure control member, one of said container members having an aperture through which the user of the tachistoscope may view symbols on said sheet when a portion of the sheet is exposed through the slot in said exposure control member; (d) a finger tab carried by said exposure control member, said tab extending outside said chamber to an exposed position to permit the user of the tachistoscope to move said exposure control member and its associated bolt means into cocked position; (e) trigger means to cooperate with said bolt means to permit the exposure control member to be selectively cocked and released by the user of the tachistoscope; and (f) tension means for urging said exposure control member, upon being triggered, from said cocked condition to a discharge position, so that said exposure slot passes momentarily over a symbol on said sheet and exposes it to the user of the tachistoscope; each of said two mating container members including a thin outer wall that helps define the outer contours of said container and each of said two mating container members having disposed within it a set of parallel rib members attached to said thin outer wall, said two sets of rib members defining between them a space for movement of both said sheet of symbols and said exposure control member, the exposed edges of one of said sets of parallel rib members lying in a single plane, and the exposed edges of the second set of said rib members lying in a second plane for a substantial portion of their length but being recessed adjacent the exposure control member for a distance longer than the distance spanned by the exposure control member during its travel from its cocked position to its discharged position, said two planes being separated by a distance slightly greater than the thickness of said sheet of symbols.

7. A near-point tachistoscope for use with a sheet of symbols to be recognized when momentarily exposed, which comprises: (a) an exposure control member comprising a movable shield with an exposure slot therein; (b) bolt means carried by said exposure control member; (c) two mating container members, said two members defining a single chamber for said sheet of symbols and said exposure control member, one of said container members having an aperture through which the user of the tachistoscope may view symbols on said sheet when a portion of the sheet is exposed through the slot in said exposure control member; (d) a finger tab carried by said exposure control member, said tab extending outside said chamber to an exposed position to permit the user of the tachistoscope to move said exposure control member and its associated bolt means into cocked position; (e) trigger means to cooperate with said bolt means to permit the exposure control member to be selectively cocked and released by the user of the tachistoscope; and (f) tension means for urging said exposure control member, upon being triggered, from said cocked condition to a discharge position, so that said exposure slot passes momentarily over a symbol on said sheet and exposes it to the user of the tachistoscope; one of said two mating container members having at least one locking means comprising at least two ridges extending in different directions, and the other of said two mating container members having grooves complementary to said ridges.

8. The near-point tachistoscope of claim 7 in which said ridges extend in directions at 90° to each other.

9. A near-point tachistoscope for use with a sheet of symbols to be recognized when momentarily exposed, which comprises: (a) an exposure control member comprising a movable shield with an exposure slot therein; (b) bolt means carried by said exposure control member; (c) two mating container members, said two members defining a single chamber for said sheet of symbols and said exposure control member, one of said container members having an aperture through which the user of the tachistoscope may view symbols on said sheet when a portion of the sheet is exposed through the slot in said exposure control member, each of said two mating container members including a thin outer wall that helps define the outer contours of said container and having disposed within it a set of parallel rib members attached to said thin outer wall, the exposed edges of one of said sets of rib members lying in a single plane, and the exposed edges of the second set of said rib members lying in a second plane for a substantial portion of their length but being recessed adjacent the exposure control member for a distance longer than the distance spanned by the exposure control member during its travel from its cocked condition to its discharge position, said two planes being separated by a distance slightly greater than the thickness of said sheet of symbols; (d) a finger tab carried by said exposure control member, said tab extending outside said chamber to an exposed position to permit the user of the tachistoscope to move said exposure control member and its associated bolt means into cocked position; (e) a sheet advancing mechanism lying largely within said chamber, said mechanism having an exposed portion extending outside said chamber that can be manipulated by the user of the tachistoscope; (f) trigger means to cooperate with said bolt means to permit the exposure control member to be selectively cocked and released by the user of the tachistoscope; and (g) tension means for urging said exposure control member, upon being triggered, from said cocked condition to a discharge position, so that said exposure slot passes momentarily over a symbol on said sheet and exposes it to the user of the tachistoscope.

References Cited
UNITED STATES PATENTS

| | | | |
|---|---|---|---|
| 2,723,466 | 11/1955 | Ott | 35—35.2 |
| 2,791,843 | 5/1957 | Warren | 35—35.2 |
| 3,020,653 | 2/1962 | Joslow | 35—35.2 |
| 3,302,309 | 2/1967 | Macomber | 35—35.2 |

EUGENE R. CAPOZIO, *Primary Examiner.*

W. H. GRIEB, *Assistant Examiner.*